(12) United States Patent
Horn et al.

(10) Patent No.: US 8,924,739 B2
(45) Date of Patent: Dec. 30, 2014

(54) SYSTEM AND METHOD FOR IN-PLACE ENCRYPTION

(75) Inventors: Deric S. Horn, Los Gatos, CA (US); Joseph Sokol, Jr., San Jose, CA (US); Owen Joseph Strain, San Francisco, CA (US); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 223 days.

(21) Appl. No.: 12/985,190

(22) Filed: Jan. 5, 2011

(65) Prior Publication Data
US 2012/0173882 A1 Jul. 5, 2012

(51) Int. Cl.
*G06F 21/00* (2013.01)
*G06F 21/78* (2013.01)

(52) U.S. Cl.
CPC ...................................... *G06F 21/78* (2013.01)
USPC ........................................................ 713/189

(58) Field of Classification Search
USPC ........................................................ 713/189
See application file for complete search history.

(56) References Cited

U.S. PATENT DOCUMENTS

| | | | |
|---|---|---|---|
| 5,584,023 A | 12/1996 | Hsu | |
| 7,694,154 B2 | 4/2010 | Youn et al. | |
| 7,849,510 B2 * | 12/2010 | Danilak | 726/26 |
| 7,890,459 B1 * | 2/2011 | Linstead | 707/610 |
| 8,549,326 B2 * | 10/2013 | Mohamed | 713/193 |
| 2003/0200459 A1 * | 10/2003 | Seeman | 713/200 |
| 2005/0235285 A1 | 10/2005 | Monasterio | |
| 2008/0240428 A1 | 10/2008 | Hobbet et al. | |
| 2009/0323940 A1 * | 12/2009 | Moffat et al. | 380/44 |
| 2010/0088525 A1 | 4/2010 | Ureche et al. | |
| 2010/0287385 A1 | 11/2010 | Conte et al. | |
| 2011/0296238 A1 * | 12/2011 | Abzarian et al. | 714/16 |
| 2011/0307708 A1 * | 12/2011 | Kritt et al. | 713/183 |

FOREIGN PATENT DOCUMENTS

| | | |
|---|---|---|
| EP | 1273996 | 1/2003 |
| EP | 1 465 075 A2 | 10/2004 |
| WO | 2010/039667 | 4/2010 |

OTHER PUBLICATIONS

TrueCrypt Documentation; retrieved on Oct. 5, 2012; from http://www.truecrypt.org/docs; Version history included to show features as prior art.*

(Continued)

*Primary Examiner* — Bradley Holder
*Assistant Examiner* — James Turchen
(74) *Attorney, Agent, or Firm* — Blakely, Sokoloff, Taylor & Zafman LLP (57) ABSTRACT

Disclosed herein are systems, methods, and non-transitory computer-readable storage media for performing in-place encryption. A system configured to practice the method receives a request from a user to encrypt an unencrypted volume of a computing device and identifies, generates, and/or randomly selects a volume key. Then the system converts the unencrypted volume to an encryptable format divided into portions. The system then encrypts, based on the volume key, the encryptable volume, portion by portion, to enable the user to use the computing device while encrypting. The system can maintain an encryption progress status and display the encryption progress status. The system can monitor disk accesses to the encryptable volume, and, when the disk accesses exceed a first threshold, apply a back-off algorithm to stop encrypting until the disk accesses fall below a second threshold. Thus, the computing device can be used while the encryption occurs in the background.

17 Claims, 3 Drawing Sheets

(56) References Cited

OTHER PUBLICATIONS

Randy Jensen, Online tutorial, "Using Truecrypt to Encrypt Your Entire Hard Drive," Apr. 29, 2008 (Available online at http://www~randyjensenonline.com/blog/using-truecrypt-to-encrypt-your-entire-hard-drive).*

Randy Jensen, Online tutorial, "Using TrueCrypt to Encrypt You Entire Hard Drive", Apr. 29, 2008, http://www.randyjensenonline.com/blog/using-truecrypt-to-encrypt-your-entire-hard-drive.*

Cryptography As An Operating System Service: A Case Study; Angelos Keromytis et al.; ACM Transactions on Computer Systems, vol. 24, No. 1, Feb. 2006, pp. 1-38.*

Research and Analysis on Encryption Principle of TrueCrypt Software System; MIAO Quan-xing; 2010; IEEE.*

Datasheet, "SafeGuard Device Encryption," Utimaco Safeware AG (now part of Sophos Ltd.), Oberursel, Germany, 2006 (Available online at http://www.sophos.com/sophos/docs/eng/factshts/sgn_device_encryption_datasheet_en.pdf, last visited Dec. 20, 2010).

Datasheet, "PGP Whole Disk Encryption," PGP Corporation (now part of Symantec Corporation, Mountain View, CA), 2010 (Available online at http://www.pgp.com/products/wholediskencryption/index.html, last visited Oct. 26, 2010).

Randy Jensen, Online tutorial, "Using Truecrypt to Encrypt Your Entire Hard Drive," Apr. 29, 2008 (Available online at http://www.randyjensenonline.com/blog/using-truecrypt-to-encrypt-your-entire-hard-drive, last visited Dec. 20, 2010).

International Search Report and Written Opinion Mailed Apr. 20, 2012, PCT International Application No. PCT/US2012/020141 (11 pages), Apr. 20, 2012.

Microsoft Corporation: "Bitlocker Drive Encryption: Technical Overview",Technet.microsoft.com, Apr. 4, 2006, XP002426529, Retrieved from the Internet: URL:http://technet.microsoft.com/en-us/windows/aa906017(d=printer).aspx [retrieved on Mar. 22, 2007].

PCT International Preliminary Report on Patentability (Chapter 1) for corresponding International Application No. PCT/US2012/020141, mailing date Jul. 18, 2013, 6 pages.

* cited by examiner

SYSTEM AND METHOD FOR IN-PLACE ENCRYPTION

BACKGROUND

1. Technical Field

The present disclosure relates to encrypting storage devices and more specifically to in-place encryption of a storage device in a computer while the user continues to use the computer.

2. Introduction

As storage devices increase in capacity and ubiquity, many users and organizations naturally have focused on securing stored data. Some threats that users may desire to secure data against include identity theft, corporate espionage, invasion of privacy, hacking, and so on. Data stored on storage devices are vulnerable to theft of the physical storage device as well as unauthorized access via a network-based attack. Corporations are typically concerned about securing confidential user data or trade secrets, while individual users are typically concerned about unintentional leaks of personal information, such as bank account information, personal data, and so forth.

One approach to secure data is encryption. Encryption does not prevent theft of the physical storage device, but renders data stored on the physical storage device useless without the encryption password. Many commercial, integrated, and open source encryption options exist in the market today, such as TrueCrypt, FreeOTFE, and CrossCrypt. The largest barrier to adoption for such encryption, especially for more secure full-disk encryption, is the time required for and inconvenience associated with encrypting an unencrypted drive. Depending on the size of the storage device, the processor speed, and the encryption algorithm, a personal computer can take up to 8 hours or more to encrypt the drive. During this time, the user is unable to use the computer for other computing tasks. For example, one online tutorial for TrueCrypt (Randy Jensen, Using trueCrypt to Encrypt Your Entire Hard Drive (April 28, 2008)sums up the current state of encrypting storage devices by saying the following: "Simply click the 'Encrypt' button and depending on your wipe mode and your encryption algorithms, go have a cup of coffee or go to sleep and let it run overnight." Accordingly, many users feel the need to encrypt their storage devices, but fail to do so because of the time and hassle associated with encrypting a storage device.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for encrypting a storage volume. A system configured to practice the method first receives a request from a user to encrypt an unencrypted volume of a computing device. The system identifies, generates, and/or randomly selects a volume key and converts the unencrypted volume to an encryptable format to yield an encryptable volume divided into portions. Then the system encrypts, based on the volume key, the encryptable volume, portion by portion, to enable the user to use the computing device during the encrypting. The system can encrypt the encryptable volume, portion by portion, using a linear approach, a random approach, an unused portion approach, and/or an order of importance approach. The system can reserve a working space on the encryptable volume and store a copy of each respective portion the working space as each respective portion is being encrypted. The working space can also store file system metadata. In some cases, the system shrinks the unencrypted volume to make room for the working space. Thus, a new result is achieved that the user is able to use the computer normally while the storage device is being encrypted, thereby removing one of the largest hurdles preventing widespread adoption of encryption. Another new result is that the system can resume encrypting the device in a consistent state without data loss after an expected or unexpected power off or restart event.

The system can maintain an encryption progress status, even across system reboots, and display the encryption progress status to the user. In order to facilitate normal use during the encryption and avoid overtaxing the storage device, the system can monitor user disk accesses to the encryptable volume, and, when the user disk accesses exceed a first threshold, apply a back-off algorithm to stop encrypting temporarily until the user disk accesses fall below a second threshold or for some other predetermined or random period of time. The system can, when the computing device requests an information transaction with a respective portion while the respective portion is being encrypted, redirect the information transaction to a temporary copy of the respective portion. Optionally, the system can delay the information transaction until the respective portion has been successfully encrypted (or decrypted, in the case of decryption). The delay introduced by this approach would be only minimally apparent to the user, if the user notices the delay at all.

The system can encrypt the encryptable volume, portion by portion, by reading a respective portion, storing a copy of the respective portion in memory, encrypting the copy of the respective portion in memory to yield an encrypted respective portion, creating a temporary copy of the respective portion, and temporarily redirecting access requests for the respective portion to the temporary copy of the respective portion. The encrypted portion is stored in a temporary location, and this temporary location becomes the permanent location of the encrypted respective portion, and the old unencrypted portion becomes a temporary location to hold an encrypted version of another portion. The portions can be of a uniform size, such as a segment, sector, track, cylinder, head, or can be of an adaptive size. The portions can be adaptively sized based on at least one of a physical characteristic of the unencrypted volume, an attribute of an operating system running on the unencrypted volume, a user action, a performance consideration, a power consumption consideration, a noise consideration, a thermal threshold consideration, and a sleep state of the computing device. In one aspect, the system ignores disk accesses made for purposes of in-place encryption or decryption when considering how long the system has been "idle" to determine when to move to a lower power state.

The system can include a processor, a storage device having at least one partition, and an operating system for controlling the processor and residing on at least part of the at least one partition of the storage device. The system can include an encryption module configured to control the processor to encrypt an unencrypted partition of the at least one partition by receiving an encryption request from a user, identifying an encryption volume key, converting the unencrypted partition to an encryptable format to yield an encryptable partition divided into regions, and encrypting, based on the encryption volume key, the encryptable partition, region by region, to enable the user to use the computing device during the encrypting. The system can include a decryption module configured to control the processor to decrypt an encrypted partition of the at least one partition by receiving a decryption request, retrieving a decryption volume key associated with the encrypted partition, and decrypting, based on the decryption volume key, the encrypted partition, block by block, to enable the user to use the computing device during the decrypting as if the encrypted partition were already decrypted.

The approaches set forth herein allow a user to begin encrypting a storage device storing an operating system while retaining the ability to use the operating system in a normal fashion during the encryption process with data consistency and without data loss.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for streamlining and simplifying the user experience for enabling and disabling encryption. A brief introductory description of a basic general purpose system or computing device in FIG. 1 which can be employed to practice the concepts is disclosed herein. A more detailed description of methods and approaches for in-place encryption will then follow. Multiple variations shall be discussed herein as the various embodiments are set forth. The disclosure now turns to FIG. 1.

Figure 1:
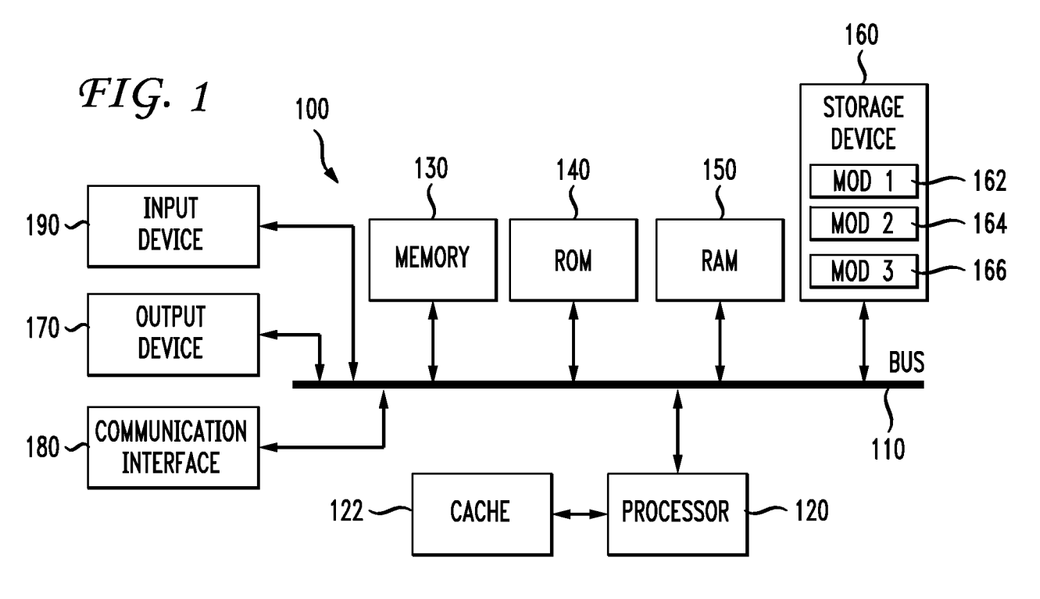
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some basic system components, the disclosure now returns to a discussion of in-place encryption. At a high level, in-place encryption and decryption are performed on a computing device "in the background" while allowing a user, the operating system, and other programs continue to use the computing device in a seemingly normal fashion. While the entire encryption or decryption process for a hard drive can last hours, the in-place approaches set forth herein perform the encryption or decryption in an atomic way that is safe and consistent while maintaining data integrity, and does not interrupt or significantly hinder a user while performing the encryption or decryption.

Figure 2:
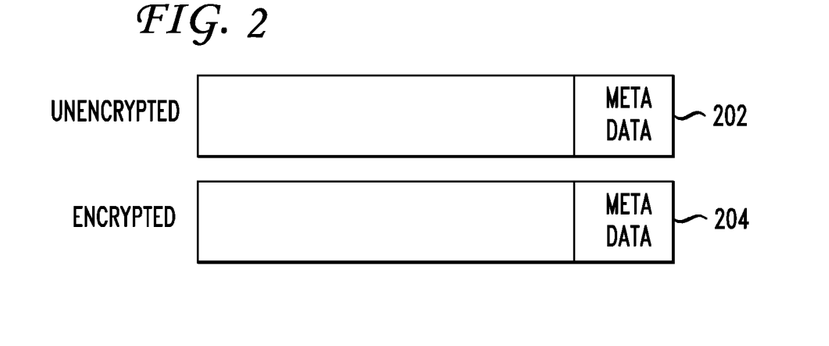
FIG. 2 illustrates an unencrypted storage volume and an encrypted storage volume.

FIG. 2 illustrates an unencrypted storage volume 202 and an encrypted storage volume 204. In each case, the storage volume includes a first portion where the user stores user data and a second portion where the operating system and/or the storage volume stores metadata. The system can convert an unencrypted storage volume 202 to an encrypted storage volume 204 in real time, but this approach requires that the available size of the encrypted storage volume is slightly smaller than the unencrypted storage volume in order to accommodate the creation of a temporary offset space. The temporary offset space facilitates atomic encryption operations so that no data is lost and so that the user can continue to access any data on the volume while the volume is being encrypted.

Figure 3:
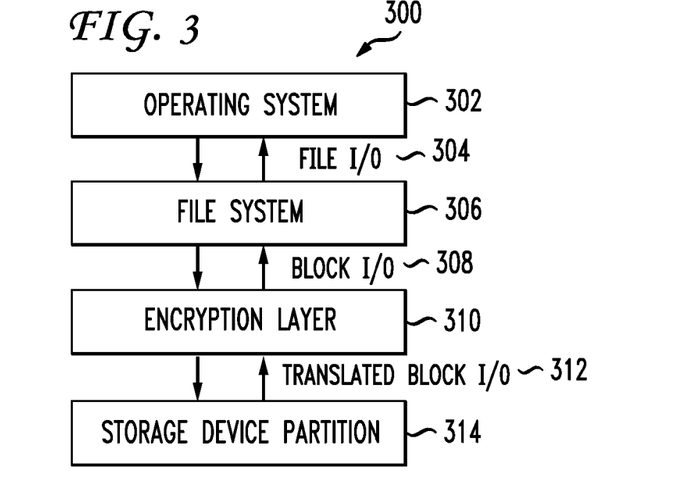
FIG. 3 illustrates a layer for intercepting operating system requests for the file system during in-place encryption.

FIG. 3 illustrates a layer 306 for intercepting operating system 302 requests for the file system 310 during in-place encryption 300. While the file system is being encrypted, the operating system 302 sends file system I/O requests 304 through a file system layer 306 and an in-place encryption layer 310 or similar application programming interface (API). The file system 306 translates a file I/O 304 request to read/write a given position of a particular file into a block I/O request 308 to read/write a particular block/sector on the disk, and then the encryption layer 310 translates that request 308 into a different block on the disk/partition, optionally performing any necessary encryption or decryption. The encryption layer makes the translated request 312 to the storage device partition 314. The encryption layer 310 may not know anything about the file system 306. Then the data is passed back to the operating system 302 through the file system 306 and the in-place encryption layer 310. The in-place encryption layer 310 can intercept every storage device operation or request for access to the storage device. The encryption layer 310 can intercept and translate I/O calls in any desired arrangement. For example, the system can shift, shuffle, or otherwise reorder the data as part of the in-place encryption process.

Figure 4:
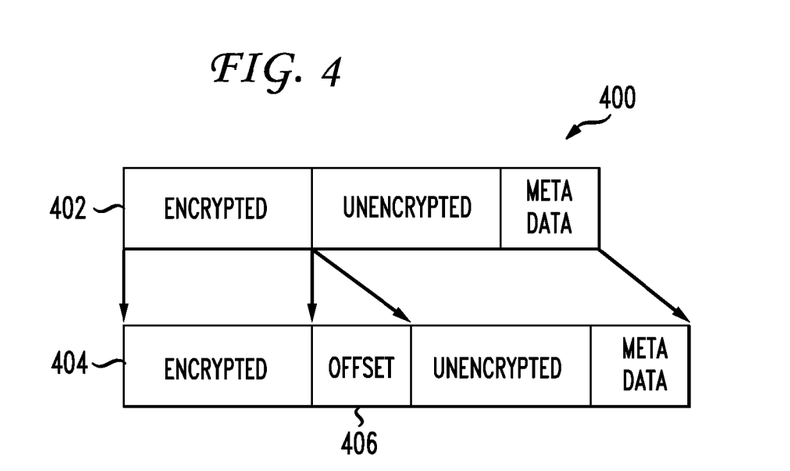
FIG. 4 illustrates an exemplary translation of a volume during in-place encryption.

FIG. 4 illustrates an exemplary translation 400 of a volume during in-place encryption. The top drive 402 is a conceptual layout of a drive in the middle of being encrypted, having an encrypted portion, an unencrypted portion, and a reserved metadata portion. The bottom drive 404 is an actual representation of the conceptual layout of the same drive. The arrows show that an offset 406 occupies a space between the encrypted and unencrypted portions. The offset 406 can store file system metadata and "scratch" data used in the in-place encryption. The operating system makes calls to the drive as if it were the conceptual layout 402, and the translation layer translates those calls to the actual representation 404. The offset 406 shifts through the drive 404 section by section while the system is operating to encrypt a particular section. In a linear approach, the offset 406 shifts from left to right until every single block on the entire drive is encrypted or overwritten. The system reads a next unencrypted block, encrypts that block in memory, and writes the newly encrypted block back to a new location on the drive. Then the system flushes the cache and flushes the corresponding metadata.

In one variation to the layout shown in FIG. 4, the encrypted data can be on the right side and the unencrypted data can be on the left side, with the scratch offset portion shifting from right to the left as the in-place encryption progresses. The in-place encryption approach can process the storage device in any direction and can start at any point, including the beginning of the device, the end of the device, and any point in between.

In one aspect, the system must change the drive partition type in order to enable encryption, such as converting an HFS+ drive to a CoreStorage drive. The system can also suspend encryption operations in order to give priority to user operations (or "normal" I/O), such as file access or copying files. The user can set a desired priority or a schedule for the encryption that can govern how, when, and for how long the system suspends encryption operations. If the encryption operations are competing with other "background" I/O operations, the system can allow both to run, or the encryption operations can back off and wait for the other "background" I/O operations, depending on the desired result. Allowing all other I/O operations to take precedent over the encryption operations will result in an overall much longer required time to encrypt the drive, whereas a more aggressive encryption approach would require a shorter time, but would slow down other operations performed on the computing device while the encryption is underway.

Further, the same principles can be applied to decrypt an encrypted drive. The user submits a drive decryption request and enters a password associated with the encrypted drive. Then the system performs in-place decryption in the background a little at a time while the user does not have to enter the password again, even though parts of the drive are still encrypted until the in-place decryption completes. When decrypting, the system still needs access to the user's password to decrypt the drive, even when the system reboots. In order to avoid prompting the user for that password multiple times, or on every system reboot, the system can, after obtaining the password, optionally encode the password in a particular format and store the password in a special location for the booter. However, the system may not store the password. In this variation, an encryption key is needed to decrypt the disk. That encryption key is normally encrypted using the user's password. When the user starts decrypting, the system stores this encryption key on disk in a format that is not encrypted, but can be encrypted, such that the user's password is not required anymore to access the volume. This has the benefit of not storing the user's password on the disk, where malicious software or other users might be able to access the password. This approach can be beneficial because many users use the same password for other purposes and want to keep that password secret.

The booter looks in that special location, sees the password, and the system can continue automatically decrypting in the background in a consistent state without data loss, even after a reboot, sudden power loss, operating system crash, hardware-caused system error, and/or other fatal system error in the computing device. On a Microsoft® Windows® machine, one example of a fatal system error is a Stop error screen, commonly known as the Blue Screen of Death (BSoD). On a Mac® OS X® machine and other BSD® UNIX® based machines, one example of a fatal system error is a kernel panic. On a Linux® machine, one example of a fatal system error is a kernel oops. The system can use login forwarding to synchronize the encryption password with the operating system or other password.

The system can allow a user to start, stop, and restart encryption while the system is encrypting or decrypting the drive in-place. The system can "rekey" the drive with a new cryptographic key when a user's access to the volume has been revoked, based on an assumption that the user has obtained (or at least had access to) the unwrapped volume key while the user had access. The rekeying mitigates the risk of compromising data due to a potentially leaked key. The system can wrap the volume key in a key encrypting key, and wrap the key encrypting key with zeros.

Figure 5:
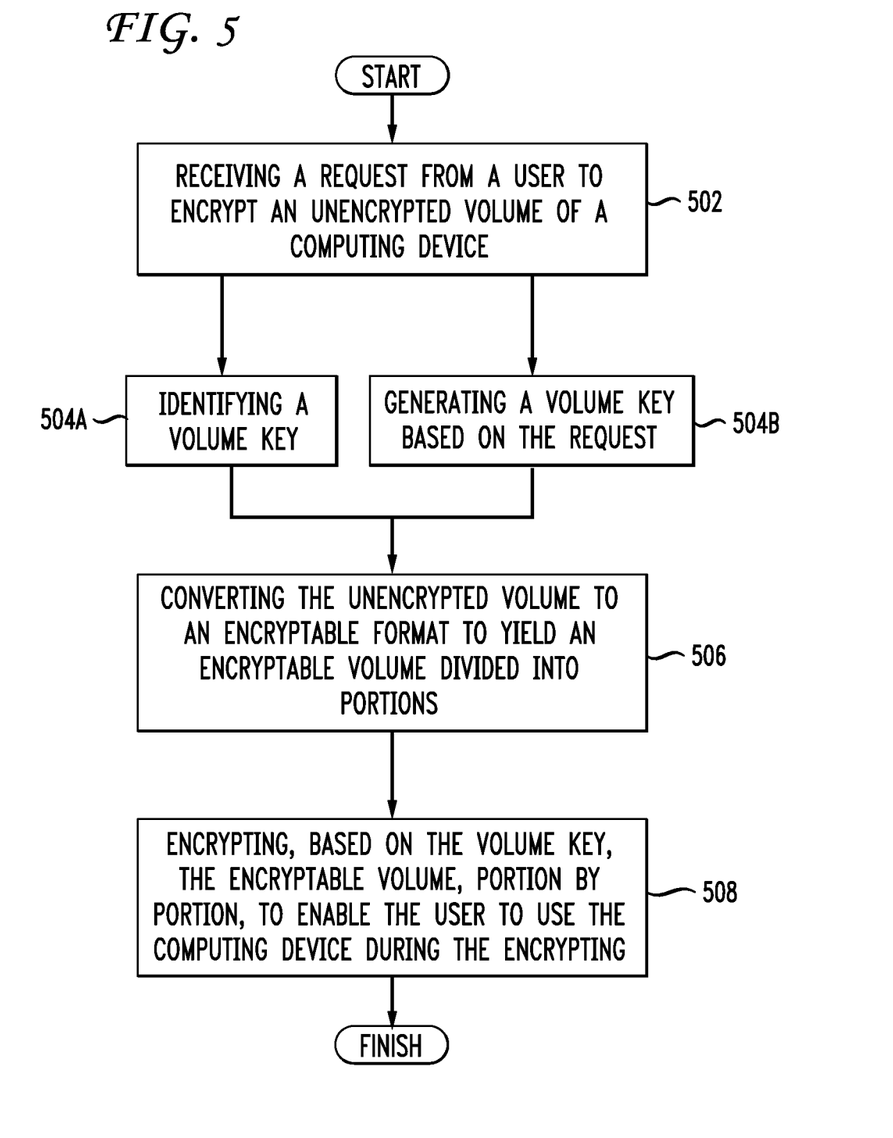
FIG. 5 illustrates an example method embodiment for performing in-place encryption.

Having disclosed some basic system components and encryption principles, the disclosure now turns to the exemplary method embodiment shown in FIG. 5 for performing in-place encryption. For the sake of clarity, the method is discussed in terms of an exemplary system such as is shown in FIG. 1 configured to practice the method. The system 100 receives a request from a user to encrypt an unencrypted volume of a computing device (502). The request can be targeted directly at encrypting the volume, or can be an explicit or implicit part of another request, such as setting up a user account or changing a password. The system 100 identifies a volume key (504A), generates a volume key based on the request (504B), randomly selects, or otherwise obtains a cryptographic key associated with the encryption.

The system 100 converts the unencrypted volume to an encryptable format to yield an encryptable volume divided into portions (506). The portions can be of a uniform size or adaptively sized. Adaptively sized portions can be based on a physical characteristic of the unencrypted volume, an attribute of an operating system running on the unencrypted volume, a user action, a performance consideration, a power consumption consideration, a noise consideration, a thermal threshold consideration, and/or a sleep state of the computing device.

The system 100 encrypts, based on the volume key, the encryptable volume, portion by portion, to enable the user to use the computing device during the encrypting (508). The system can allow the user to use the computing device in a normal fashion by redirecting any information transaction requests to a temporary copy of a respective portion when the computing device requests an information transaction with a respective portion while the respective portion is being encrypted. The system can encrypt the encryptable volume by a linear approach, a random approach, an unused portion approach, and/or an order of importance approach. The system can reserve a working space on the encryptable volume and encrypt the encryptable volume, portion by portion, by storing a copy of each respective portion the working space as each respective portion is being encrypted. The working space can also store file system metadata. Converting the unencrypted volume to the encryptable format can include shrinking the unencrypted volume to make room for the working space. The system can encrypt the encryptable volume, portion by portion, by reading a respective portion, storing a copy of the respective portion in memory, encrypting the copy of the respective portion in memory to yield an encrypted respective portion, creating a temporary copy of the respective portion. The system stores the encrypted portion in a temporary location, and this temporary location becomes the permanent location of the encrypted respective portion, and the old unencrypted portion becomes a temporary location to hold an encrypted version of another portion.

The system can maintain an encryption progress status and display the encryption progress status to the user, such as a progress bar, a percentage, a graphical chart of a representative physical layout of encrypted vs. unencrypted portions on the drive, blocks remaining, bytes encrypted, and so forth. The encryption progress status can also include an estimated completion time, CPU time spent encrypting, and/or other statistics.

In order to allow the user to continue to use the computing device in a normal fashion, the system can monitor user disk accesses to the encryptable volume, and, when the user disk accesses exceed a first threshold, apply a back-off algorithm to temporarily stop encrypting until the user disk accesses fall below a second threshold. This can be helpful because the encryption operations can be very disk I/O intensive, which would slow down user-initiated operations.

In another embodiment, the system is a computing device having a processor, a storage device with at least one partition, and an operating system for controlling the processor and residing on at least part of the at least one partition of the storage device. The computing device includes an encryption module configured to control the processor to encrypt an unencrypted partition of the at least one partition by receiving an encryption request from a user, identifying an encryption volume key, converting the unencrypted partition to an encryptable format to yield an encryptable partition divided into regions, and encrypting, based on the encryption volume key, the encryptable partition, region by region, to enable the user to use the computing device during the encrypting. The computing device can include a decryption module configured to control the processor to decrypt an encrypted partition of the at least one partition by receiving a decryption request, retrieving a decryption volume key associated with the encrypted partition, and decrypting, based on the decryption volume key, the encrypted partition, block by block, to enable the user to use the computing device during the decrypting as if the encrypted partition were already decrypted.

A system is disclosed for performing in-place decryption having a storage volume that is at least partially encrypted and that is divided into portions. The system includes a first module configured to control the processor to receive a volume key associated with the storage volume and a second module configured to control the processor to decrypt, based on the volume key, the storage volume, portion by portion, to enable a user to use the storage volume while decrypting as if the storage volume were already decrypted. The system can include a third module configured to control the processor to store the volume key in a storage read by a boot loader, such that when the boot loader first runs at system boot, the boot loader reads the volume key, provides access to remaining encrypted portions the storage volume based on the volume key, and causes the system to resume, at a same position where the system stopped decrypting before shutting down, decrypting the remaining encrypted portions of the storage volume portion by portion based on the volume key.

The approaches disclosed herein allow a user to initiate encryption of a storage device and still continue to use software, such as an operating system or other applications, stored on the storage device while the system is in the process of encrypting the storage device. This approach reduces the initial barrier to setting up an encrypted drive, enabling users to more easily take advantage of the security and privacy benefits of whole-disk encryption.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method of performing encryption, the method comprising:
    receiving a request from a user to encrypt an unencrypted volume of a computing device;
    identifying a volume key;
    converting the unencrypted volume to an encryptable format to yield an encryptable volume divided into unencrypted portions, the encryptable volume further including a temporary offset space to store file system metadata and scratch data used to encrypt the unencrypted portions, the temporary offset space positioned on the encryptable volume at a location between encrypted and unencrypted portions; and
    encrypting, based on the volume key, each one of the unencrypted portions separately to create a corresponding encrypted portion at a location on the encryptable volume that previously held a different unencrypted portion; and
    shifting the temporary offset space on the encryptable volume to a new location between newly encrypted and remaining unencrypted portions after encrypting each one of the unencrypted portions,
wherein the user accesses a temporary copy of the unencrypted portion stored in a working space during the encrypting of the unencrypted portion and wherein, in response to receiving a decryption request from the user, retrieving a decryption volume key associated with the encrypted volume and decrypting, based on the decryption volume key, the encrypted partition, block by block, to enable the user to use the computing device during the decrypting as if the encrypted partition was already decrypted.

2. The method of claim 1, further comprising:
maintaining an encryption progress status; and
displaying the encryption progress status to the user.

3. The method of claim 1, further comprising:
monitoring user disk accesses to the encryptable volume; and
when the user disk accesses exceed a first threshold, applying a back-off algorithm to temporarily stop encrypting until the user disk accesses fall below a second threshold.

4. The method of claim 1, wherein the encrypting is performed by one of a linear approach, a random approach, an unused portion approach, and an order of importance approach.

5. The method of claim 1, further comprising:
reserving the working space on the encryptable volume.

6. The method of claim 5, wherein converting the unencrypted volume to the encryptable format further comprises shrinking the unencrypted volume to make room for the working space.

7. The method of claim 1, wherein the encrypting further comprises:
reading the unencrypted portion;
storing a copy of the unencrypted portion in memory;
encrypting, via a processor, the copy of the respective portion in memory to yield the encrypted portion;
creating the temporary copy of the unencrypted portion into the working space; and
storing the encrypted portion in a temporary location, wherein the temporary location becomes a permanent location of the encrypted portion, and wherein a former unencrypted portion becomes a new temporary location to hold an encrypted version of a next portion.

8. The method of claim 1, wherein the portions are of a uniform size.

9. The method of claim 1, wherein the encrypting the continues in a consistent state without data loss after at least one of a reboot of the computing device, a loss of power to the computing device, and a fatal system error in the computing device.

10. The method of claim 9, wherein the portions are adaptively sized based on at least one of a physical characteristic of the unencrypted volume, an attribute of an operating system running on the unencrypted volume, a user action, a performance consideration, a power consumption consideration, a noise consideration, a thermal threshold consideration, and a sleep state of the computing device.

11. A computing device comprising:
a processor;
a storage device having at least one partition;
an operating system for controlling the processor and residing on at least part of the at least one partition of the storage device;
an encryption process configured to control the processor to encrypt an unencrypted partition of the at least one partition by performing steps comprising:
receiving an encryption request from a user;
identifying an encryption volume key;
converting the unencrypted partition to an encryptable format to yield an encryptable partition divided into unencrypted regions, the encryptable partition further including a temporary offset space to store file system metadata and scratch data used to encrypt the unencrypted regions, the temporary offset space positioned on the encryptable partition at a location between encrypted and unencrypted regions;
encrypting, based on the encryption volume key, each one of the unencrypted regions separately to create a corresponding encrypted region at a location on the encryptable partition that previously held a different unencrypted region; and
shifting the temporary offset space on the encryptable partition to a new location between newly encrypted and remaining unencrypted regions after encrypting each one of the unencrypted regions, wherein the user accesses a temporary copy of the unencrypted region stored in a working space during the encrypting of the unencrypted region; and
a decryption process configured to control the processor to decrypt an encrypted partition of the at least one partition by performing steps comprising:
receiving a decryption request;
retrieving a decryption volume key associated with the encrypted partition; and
decrypting, based on the decryption volume key, the encrypted partition, block by block, to enable the user to use the computing device during the decrypting as if the encrypted partition was already decrypted.

12. The computing device of claim 11, wherein the encryption module is further configured to control the processor to display an indication of progress of encrypting the unencrypted partition.

13. The computing device of claim 11, wherein an intermediate layer residing between an operating system of the computing device and the unencrypted volume encrypts the unencrypted volume.

14. A non-transitory computer-readable storage medium storing instructions which, when executed by a computing device, cause the computing device to perform encryption, the instructions comprising:
receiving a request from a user to encrypt an unencrypted partition on a volume of a computing device;
generating a volume key based on the request;
converting the unencrypted partition to an encryptable format to yield an encryptable partition divided into unencrypted chunks, the encryptable partition further including a temporary offset space to store file system metadata and scratch data used to encrypt the unencrypted chunks, the temporary offset space positioned on the encryptable partition at a location between encrypted and unencrypted chunks;
encrypting, based on the volume key, each one of the unencrypted chunks separately to create a corresponding encrypted chunk at a location on the encrypted partition that previously held a different unencrypted chunk; and
shifting the temporary offset space on the encryptable partition to a new location between newly encrypted and remaining unencrypted chunks after encrypting each one of the unencrypted chunks,
wherein the user accesses a temporary copy of the unencrypted chunk stored in a working space during the encrypting of the unencrypted chunk and wherein, in response to receiving a decryption request from the user, retrieving a decryption volume key associated with the encrypted volume and decrypting, based on the decryption volume key, the encrypted partition, block by block, to enable the user to use the computing device during the decrypting as if the encrypted partition was already decrypted.

15. The non-transitory computer-readable storage medium of claim 14, the instructions further comprising:
maintaining an encryption progress status; and
displaying the encryption progress status to the user.

16. The non-transitory computer-readable storage medium of claim 14, the instructions further comprising:
   monitoring user disk accesses to the unencrypted volume; and
   when the user disk accesses exceed a first threshold, applying a back-off algorithm to temporarily stop encrypting the unencrypted volume until the user disk accesses fall below a second threshold.

17. The non-transitory computer-readable storage medium of claim 14, the instructions further comprising:
   reserving the working space on the unencrypted volume.

* * * * *